(12) United States Patent
Trinschek

(10) Patent No.: US 11,059,603 B2
(45) Date of Patent: Jul. 13, 2021

(54) EXTERIOR AIRCRAFT LIGHT COMPRISING AT LEAST ONE SWITCHABLE ILLUMINATION CIRCUITS WHICH COMPRISES LIGHT SOURCES, A TEMPERATURE DETECTOR, A SWITCH, AND A CONTROL CIRCUIT

(71) Applicant: Goodrich Lighting Systems GmbH, Lippstadt (DE)

(72) Inventor: Robert Trinschek, Hamm (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 16/229,198

(22) Filed: Dec. 21, 2018

(65) Prior Publication Data
US 2019/0193868 A1    Jun. 27, 2019

(30) Foreign Application Priority Data

Dec. 23, 2017    (EP) .................................... 17210560

(51) Int. Cl.
*H05B 45/14*  (2020.01)
*H05B 45/18*  (2020.01)
(Continued)

(52) U.S. Cl.
CPC ............. *B64D 47/06* (2013.01); *B64D 47/02* (2013.01); *H05B 45/10* (2020.01); *H05B 45/14* (2020.01);
(Continued)

(58) Field of Classification Search
CPC ................ B64D 2203/00; B64D 47/06; B64D 2011/0038; B64D 47/02; H05B 33/0848;
(Continued)

(56) References Cited

U.S. PATENT DOCUMENTS

| 6,191,541 | B1 | 2/2001 | Patel et al. |
| 8,534,867 | B1 * | 9/2013 | Beadle .................. F21V 17/002 362/153.1 |

(Continued)

FOREIGN PATENT DOCUMENTS

| EP | 2362716 A2 | 8/2011 |
| EP | 2607238 A1 | 6/2013 |

OTHER PUBLICATIONS

Extended European Search Report for International Application No. 17210560.3 dated Feb. 27, 2018, 7 pages.

*Primary Examiner* — Borna Alaeddini
(74) *Attorney, Agent, or Firm* — Cantor Colburn LLP

(57) ABSTRACT

An exterior aircraft light comprises at least one switchable illumination circuit. Each of the at least one switchable illumination circuits comprises at least one light source, a temperature detector configured for detecting the temperature of the at least one light source and providing a temperature signal, an electric switch for selectively switching power flow to the at least one light source on and off, and a control circuit which is coupled to the temperature detector and to the electric switch. The control circuit is configured for driving the electric switch based on the temperature signal provided by the temperature detector to repeatedly switch power flow to the at least one light source on and off.

15 Claims, 6 Drawing Sheets

(51) Int. Cl.
*B64D 47/06* (2006.01)
*B64D 47/02* (2006.01)
*H05B 45/10* (2020.01)
*H05B 45/37* (2020.01)

(52) U.S. Cl.
CPC ............ H05B 45/18 (2020.01); H05B 45/37 (2020.01); *B64D 2203/00* (2013.01)

(58) Field of Classification Search
CPC ............ H05B 33/0803; H05B 33/0815; H05B 33/0818; H05B 33/0842; H05B 33/0851; H05B 33/0854; H05B 33/089; H05B 33/0893; H05B 37/02; H05B 37/0254; H05B 45/14; H05B 45/37; H05B 45/10; H05B 45/18
See application file for complete search history.

(56) References Cited

U.S. PATENT DOCUMENTS

| | | |
|---|---|---|
| 9,386,638 B2 | 7/2016 | Trinschek et al. |
| 9,472,108 B2 | 10/2016 | Seelamonthula et al. |
| 9,629,220 B2 * | 4/2017 | Panopoulos ......... H05B 47/105 |
| 2005/0168168 A1 * | 8/2005 | Elliott ................ H05B 33/0818 315/247 |
| 2007/0040696 A1 | 2/2007 | Mubaslat et al. |
| 2007/0052373 A1 * | 3/2007 | Hui ..................... H05B 41/2881 315/291 |
| 2008/0137353 A1 * | 6/2008 | Larsen .................. B64D 47/04 362/470 |
| 2011/0019430 A1 * | 1/2011 | Wilkinson ............ B64D 47/06 362/470 |
| 2012/0019164 A1 * | 1/2012 | Gambeski ............. B64D 47/02 315/294 |
| 2013/0154476 A1 * | 6/2013 | Hessling ............ H05B 33/0893 315/77 |
| 2013/0300296 A1 * | 11/2013 | Mueller ................. H05B 45/00 315/130 |
| 2014/0203711 A1 * | 7/2014 | Saccomanno ........ G09G 3/3406 315/151 |
| 2014/0300284 A1 * | 10/2014 | Lee ...................... H05B 33/086 315/186 |
| 2015/0061498 A1 | 3/2015 | Paffrath et al. |
| 2015/0274318 A1 | 10/2015 | Hessling Von Heimendahl et al. |
| 2016/0227616 A1 * | 8/2016 | Lee ........................ H05B 45/37 |
| 2016/0341655 A1 * | 11/2016 | Jha ....................... G01N 17/004 |

* cited by examiner

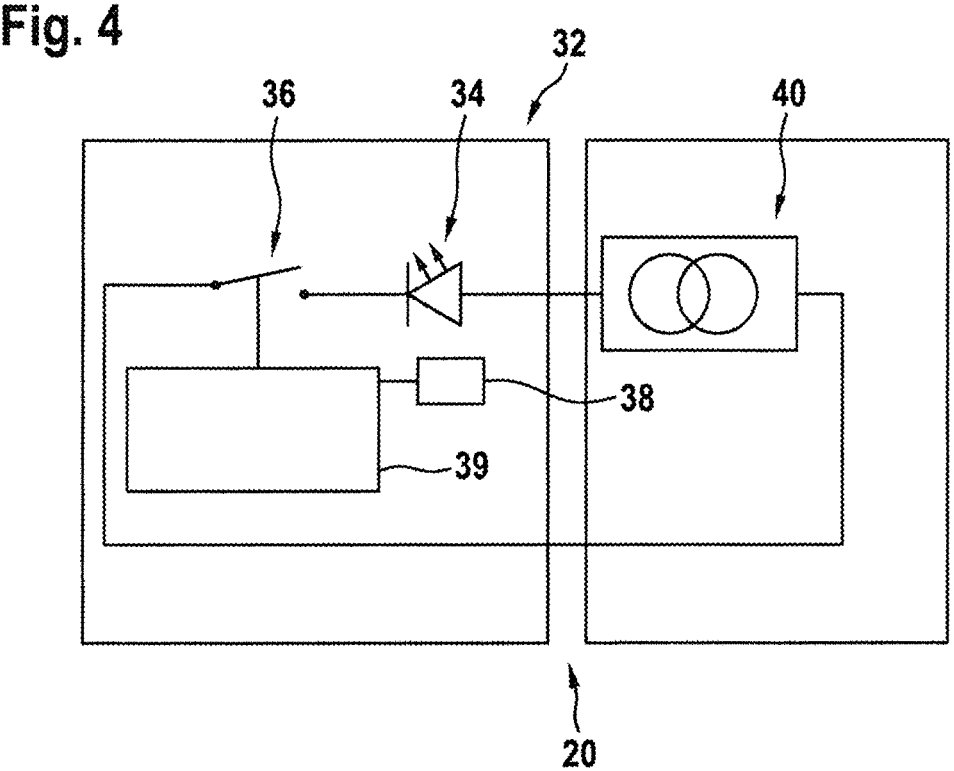

EXTERIOR AIRCRAFT LIGHT COMPRISING AT LEAST ONE SWITCHABLE ILLUMINATION CIRCUITS WHICH COMPRISES LIGHT SOURCES, A TEMPERATURE DETECTOR, A SWITCH, AND A CONTROL CIRCUIT

FOREIGN PRIORITY

This application claims priority to European Patent Application No. 17210560.3 filed Dec. 23, 2017, the entire contents of which is incorporated herein by reference.

TECHNICAL FIELD

The present invention relates to aircraft lighting. It in particular relates to an exterior aircraft light and, more particularly, to an exterior aircraft light having multiple light sources. It further relates to a method of operating such an exterior aircraft light and to an aircraft comprising such an exterior aircraft light.

BACKGROUND

Almost all aircraft are equipped with exterior lights. In particular, large passenger air planes are provided with a wide variety of exterior lights. The exterior lights are provided for a wide variety of different purposes, such as for allowing the passengers and/or air crew to view the outside, for passive visibility, for signaling purposes, etc. Examples of such exterior lights are navigation lights, also referred to as position lights, beacon lights, anti-collision lights, wing scan lights, take-off lights, landing lights, taxi lights, runway turn-off lights, etc.

Each of said exterior lights may comprise a plurality of light sources. When operated, the temperature of said light sources increases. The temperature of the light sources, in particular of LEDs, however, needs to be restricted to avoid damage of the light sources and to operate the light sources with good efficiency.

Thus, often heat sinks are provided in thermal connection with the light sources for dissipating the heat generated by operating the light sources. Ideally, the heat sinks would be designed so that the thermal loads/temperatures of all light sources of an exterior light are the same in order to allow operating all light sources simultaneously with good efficiency. For practical reasons, such as the mounting position and/or the spatial orientation of the exterior light, the heat sinks are often not ideal in real life exterior lights, so that the thermal loads/temperatures of the light sources of an exterior light are not the same. As a result, not all light sources of the exterior light may be operated simultaneously with good efficiency.

It therefore would be beneficial to provide an exterior aircraft light, having a plurality of light sources, which allows for simultaneously operating all light sources at good thermal conditions.

SUMMARY

Exemplary embodiments of the invention include an exterior aircraft light comprising at least one switchable illumination circuit, wherein each of the at least one switchable illumination circuit comprises at least one light source, a temperature detector configured for detecting the temperature of the at least one light source and providing a temperature signal, an electric switch for selectively switching power flow to the at least one light source on and off, and a control circuit, coupled to the temperature detector and to the electric switch. The control circuit is configured for driving the electric switch based on the temperature signal provided by the temperature detector to repeatedly switch power flow to the at least one light source on and off.

Exemplary embodiments of the invention further include a method of operating an exterior aircraft light comprising at least one switchable illumination circuit, each of the at least one switchable illumination circuit comprising at least one light source, a temperature detector configured for detecting the temperature of the at least one light source, and an electric switch for selectively switching power flow to the at least one light source on and off, wherein the method includes for each of the at least one switchable illumination circuits: detecting the temperature of the at least one light source and controlling the electric switch for repeatedly switching power flow to the at least one light source on and off based on the detected temperature of the at least one light source.

In the context of the present disclosure, the "temperature of the at least one light source" may be the temperature of the at least one light source itself or the temperature of an area surrounding the respective light source or any other detectable temperature value that is a good indication of the temperature of the at least one light source itself.

The temperature detector may be or may include a temperature sensitive element, i.e. a temperature sensor, configured for directly detecting/measuring the temperature of or close to the associated light source. Alternatively or additionally, the temperature detector may be or may include a temperature determination element, which is configured for determining the actual temperature indirectly, e.g. from the light emission generated by the respective light source, the current at the respective light source or similar parameters.

Switching power flow to the at least one light source repeatedly on and off allows for operating the light sources at beneficial or even optimal thermal operation points and for preventing that a predetermined threshold (upper limit) of a desired temperature range for the at least one light source is exceeded. In particular, due to experiencing power flow for a portion of the time only, the temperature of the at least one light source may stay within desirable/acceptable limits. During periods of no power flow, the at least one light source can repeatedly cool down.

The control circuit in particular may be configured for controlling the electric switch to switch power flow to the at least one light source so that the temperature detected by the temperature detector does not deviate more than 10%, in particular not more than 5%, from a given reference temperature value. The reference temperature value may be predetermined or set by a global control circuit, e.g. for leveling among different switchable illumination circuits. Alternatively, the reference temperature value may be provided by the manufacturer of the respective light source(s) representing the preferred temperature for operating the respective light source.

As a result, the light emissions of the light sources, in particular their intensities, may be achieved efficiently at a low risk of damaging the light sources due to overheating. Also, a similar or even uniform aging of the light sources may be achieved. Further, true energy savings can be achieved by turning the power flow to the light sources off repeatedly. Yet further, the temperature control of the at least one light source may be carried out within the switchable illumination circuit. The switchable illumination circuit is a stand-alone entity that provides for detection of the temperature at the at least one light source and for adaptation of the electric behavior in order to regulate the temperature. Hence, no communication outside of the switchable illumination circuit, in particular no communication to a power supply, is required for keeping the temperature of the at least one light source in a desired range. In this way, wiring and/or other communication components to a power supply can be saved. This in turn may lead to a space and weight reduction of the exterior aircraft light.

Repeatedly switching the power flow to the at least one light source on and off may result in repeatedly switching the at least one light source on and off. In particular, for the case of fast reacting light sources, such as electronic light sources such as LEDs, switching the power flow to the at least one light source on and off may instantly or quasi-instantly result in switching the at least one light source on and off.

According to an embodiment, the control circuit is configured for driving the electric switch to periodically switch power flow to the at least one light source on and off. The control circuit in particular may be configured for adjusting a duty cycle of the signal driving the electric switch based on the temperature signal provided by the at least one temperature detector. This results in a PWM modulation of the power flow to the at least one light source allowing for a very efficient control of the temperature and light emission of the at least one light source.

According to an embodiment, the control circuit is configured for driving the electric switch to switch power flow to the at least one light source on and off with a frequency of 100 Hz to 20 kHz, in particular with a frequency of 100 Hz to 1 kHz, more particularly with a frequency of 400 Hz to 500 Hz. When the power flow to the at least one light source is switched on and off with such frequencies, the resulting switching of the at least one light source is not recognized by the human eye. As a result, the switching has no negative effect on the impression of illumination provided by the exterior aircraft light.

According to an embodiment, each of the at least one switchable illumination circuit comprises a current bypass and the electric switch is configured for bypassing the electric current by the at least one light source via the current bypass in order to switch off power flow to the at least one light source. Bypassing the electric current by the at least one light source for deactivating the at least one light source allows switching a plurality of serially connected switchable illumination circuits independently of each other as the supply of electric current/power to the switchable illumination circuits is not interrupted when at least one of the switchable illumination circuits is switched off. Providing a series connection of switchable illumination circuits allows for an easy installation of a plurality of switchable illumination circuits at low costs. Also, when bypassing the electric current by the at least one light source, electric energy can be saved. The voltage drop otherwise caused by the at least one light source can be prevented. With the bypass current having the same value as the electric current otherwise going through the at least one light source, electric power up to the product of said electric current and the voltage drop at the at least one light source can be saved. The current bypass may be a simple wire, leading to very high energy savings, or may have one or few circuit components, such as a simple diode and/or a small value resistor, or any other suitable circuit structure.

According to an embodiment, the electric switch may be configured for interrupting the electric current through the switchable illumination circuit in order to switch off power flow to the at least one light source. In such a configuration, the electric current through the switchable illumination circuit is not diverted through a current bypass, but stopped completely. In this way, even larger energy savings and/or larger reductions of thermal losses can be achieved.

According to an embodiment, the temperature detector is or includes a temperature sensitive element, which is configured for directly detecting the temperature of the respective at least one light source. Temperature sensitive elements allow for a direct detection of the temperatures at the light sources.

According to an embodiment, the temperature detector is or includes a temperature determination element, which is configured for determining the temperature of the respective light source indirectly from at least one other detected or measured parameter. Said parameters may include the flux generated by the respective light source or a current measured at the electric connectors of the light source. This allows for a good proxy detection of the temperatures at the light sources without using temperature sensitive elements.

According to an embodiment, each of the at least one switchable illumination circuit forms a functional unit of spatially associated components. In such a functional unit of spatially associated components, the at least one light source, the temperature detector, the electric switch and the control circuit of each of the at least one switchable illumination circuit in particular may be arranged within less than 10 cm from each other, further in particular 6 cm or less from each other. Such functional units allow for compact exterior aircraft lights which need only small space for installation. Also, providing such functional units allows for providing the temperature control close to the at least one light source, keeping the wiring and communication efforts for the temperature control very low.

According to an embodiment, the at least one light source is at least one LED. LEDs are efficient light sources having a high reliability and a long lifetime, which may be provided at low costs. The temperature control within the switchable illumination circuit is particularly useful for exterior aircraft lights having LEDs as light sources. Keeping the operating temperature within acceptable limits has a particularly beneficial effect on the efficiency and longevity of LEDs.

According to an embodiment, the at least one light source is a plurality of light sources which are connected serially or in parallel to each other. Connecting a plurality of light source serially or in parallel to each other for forming a light source group allows for controlling the temperature of a plurality of light sources employing only a single temperature detector, a single electric switch and a single control circuit, respectively. In particular, providing a plurality of light sources in series is a low complexity implementation for ensuring that these light sources receive the same current, thus achieving a nominally identical behavior of these light sources with low complexity.

According to an embodiment, the exterior aircraft light further comprises an electric power supply which is configured for supplying a constant electric current to each of the at least one switchable illumination circuit. The electric power supply in particular may be spatially separated from the at least one switchable illumination circuit. The electric power supply for example may be located in a distance of between 0.2 m and 10 m, in particular of between 0.2 m and 1 m, further in particular of between 0.2 m and 0.5 m, from the at least one switchable illumination circuit.

According to an embodiment, the electric power supply may a current source. In particular, the electric power supply may be a regulated current source that provides for a fast regulation of the output current. For example, the electric power supply may be a current source that regulates its output current to a desired current value within 0.001 seconds. In this way, the current source may be able to react very fast to the switching changes in the switchable illumination circuits, thus achieving a highly constant current through the switchable illumination circuits, in particular when individual ones of multiple switchable illumination circuits are subject to a repeated on/off switching of the power flow to the at least one light source, and realizing the energy savings made possible by switching the power flow to the light source(s) off.

According to an embodiment, the electric power supply may be integrated into the exterior aircraft light, with the at least one switchable illumination circuit for providing a compact autonomous exterior aircraft light.

According to an embodiment, the electric power supply may be located e.g. in the fuselage of the aircraft, while the at least one switchable illumination circuit comprising the at least one light source is located in a wing or at a gear of the aircraft. This provides an exterior aircraft light having less weight and reduced dimensions, which may be beneficial when the exterior aircraft light is mounted to a wing or to a gear of the aircraft According to an embodiment, the control circuit is independent from the electric power supply, i.e. the control circuit is spatially separated from the electric power supply and is configured to be operated independent from the electric power supply. As laid out above, even an independently operated electric power supply may be able to react to the power demands caused by the control circuit(s) of the switchable illumination circuit(s) in order to provide a basically constant electric current under all operating conditions, in particular independent of the number of lights sources switched on and off. The independently operated electric power supply may react to the changing power demands of the one or more switchable illumination circuits, without receiving according communications or signals from the one or more switchable illumination circuits. Rather, the independently operated electric power supply may be configured to provide a certain kind of power, such as a certain operating current, irrespective of the momentary load.

According to an embodiment, the control circuit is independent from other global control means provided within the aircraft. An independent control circuit, however, might be configured to receive at least one temperature reference value from a global control means in order to synchronize the temperatures of the light sources within the aircraft.

According to an embodiment, the at least one switchable illumination circuit is a plurality of switchable illumination circuits, wherein the plurality of switchable illumination circuits are in particular 2, 3, 4, 5, 6, 7, 8, 9, 10 or more switchable illumination circuits. Such a configuration allows for individually controlling the temperatures of various sets of light sources provided in an exterior aircraft light.

The exterior aircraft light may be configured to be employed as one of a taxi light, a landing light, a takeoff light, a runway turn-off light, and a multi-purpose light combining the functionality of at least two of a landing light, a taxi light, a runway turn-off light and a take-off light. The exterior aircraft light may also be configured to be employed as a cargo loading light, an anti-collision strobe light, an anti-collision beacon light, a logo light, a wing scan light, or an engine scan light.

Due to the large amount of heat generated, the provision of variable current bypass components may be particularly useful in a taxi light, a landing light, a takeoff light, or a runway turn-off light. It is understood that above terms also include multi-purpose lights having one or more of the given functionalities. For example, the term landing light includes a combined landing, takeoff, and taxi light. For such combined multi-purpose lights, it is possible that, for each functionality, the exterior aircraft light has the above described structure including at least one switchable illumination circuit for controlling the temperatures of the respective light sources.

BRIEF DESCRIPTION OF THE DRAWINGS

Exemplary embodiments of the invention further include an aircraft, such as an airplane or a helicopter, comprising at least one exterior aircraft light, as described in any of the embodiments above. The additional features, modifications, and effects, described above with respect to the exterior aircraft light, apply to the aircraft in an analogous manner.

Exemplary embodiments of the invention are described in detail below with reference to the figures.

FIG. 4 depicts an exemplary embodiment of a switchable illumination circuit together with a power supply in a circuit/block diagram.

DETAILED DESCRIPTION

Figure 1A:
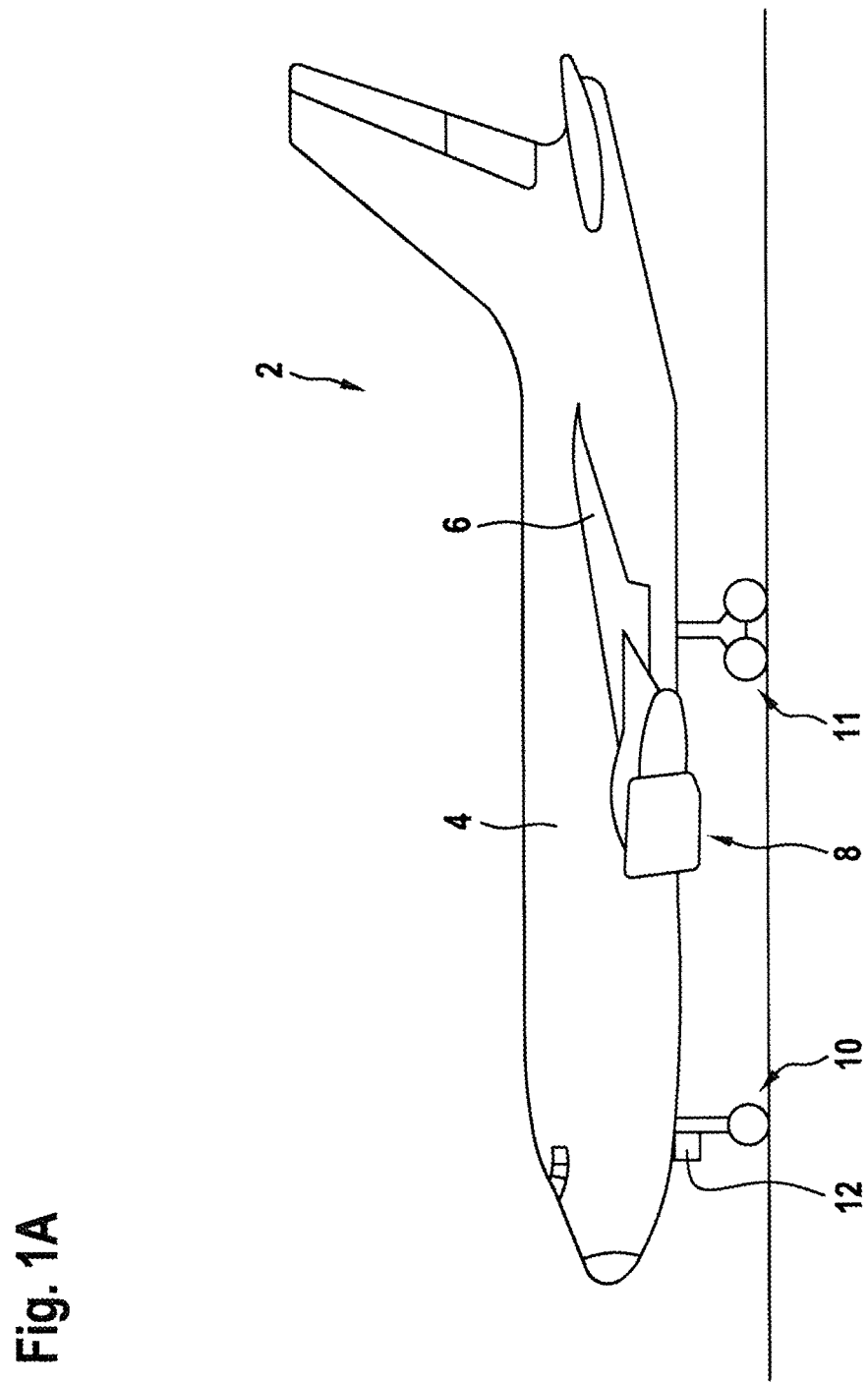
FIG. 1A shows a side view of an airplane comprising exterior aircraft lights according to exemplary embodiments of the invention.
Figure 1B:
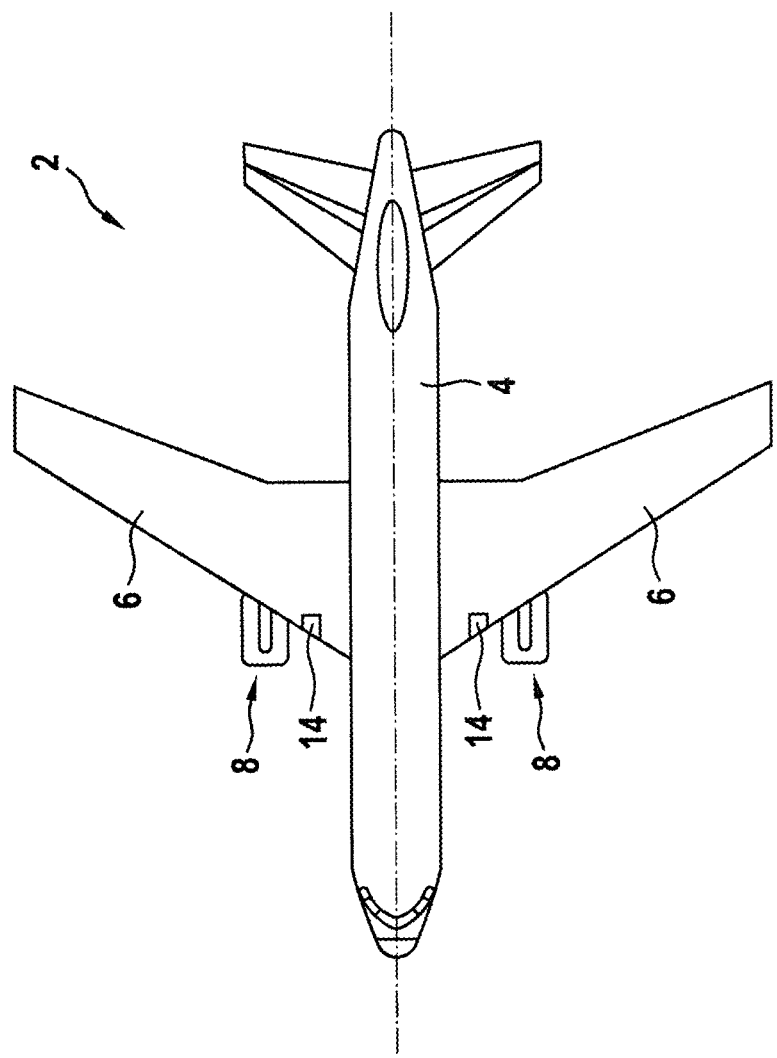
FIG. 1B shows a top view of the airplane depicted in FIG. 1A.

FIG. 1A shows a side view of an aircraft 2 comprising exterior aircraft lights 12, 14 according to exemplary embodiments of the invention, and FIG. 1B shows a top view of said aircraft 2.

Figure 2:
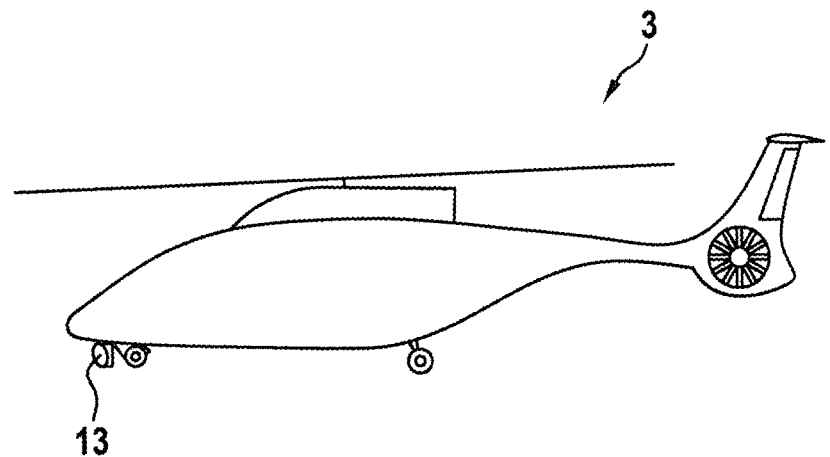
FIG. 2 shows a side view of a helicopter comprising an exterior aircraft light according to exemplary embodiments of the invention.

In the embodiment shown in FIGS. 1A and 1B, the aircraft 2 is an airplane 2 comprising a fuselage 4 and two wings 6 extending from the fuselage 4. A jet engine 8 is mounted to each of the wings 6. The skilled person, however, will understand that the invention may be applied to aircraft 2 comprising propellers (not shown) instead of jet engines 8 and to aircraft 2 in which the engine(s) 8 or propeller(s) are mounted to the fuselage 4 instead of the wings 6. The skilled person will further understand that exemplary embodiments also may include exterior aircraft lights 13 mounted to a helicopter 3, as depicted in FIG. 2.

The aircraft/airplane 2 shown in FIGS. 1A and 1B comprises a front running gear and at least one main running gear 11.

A first exterior aircraft light 12 is mounted to the front running gear 10. Two second exterior aircraft lights 14 are mounted to or integrated with each of the wings 6. In particular, the second exterior aircraft lights 14 are integrated into respective wing root portions of the wings 6. The second aircraft lights 14 are not visible in FIG. 1A, as they are covered by the engine 8 and/or the fuselage 4. The first aircraft light 12 is not visible in FIG. 1B, as it is covered by the fuselage 4 of the aircraft 2.

Alternatively or additionally, exterior aircraft lights according to exemplary embodiments of the invention may be mounted to at least one of the main running gear 11 and/or to the fuselage 4 of the aircraft 2.

Each of the exterior aircraft lights 12, 14 may be one of a landing light, a taxi light, a runway turn-off light, and a take-off light. Each of the exterior aircraft light 12, 14 also may be a multi-purpose exterior aircraft light 12, 14 combining the functionality of at least two of a landing light, a taxi light, a runway turn-off light and a take-off light.

Figure 3A:
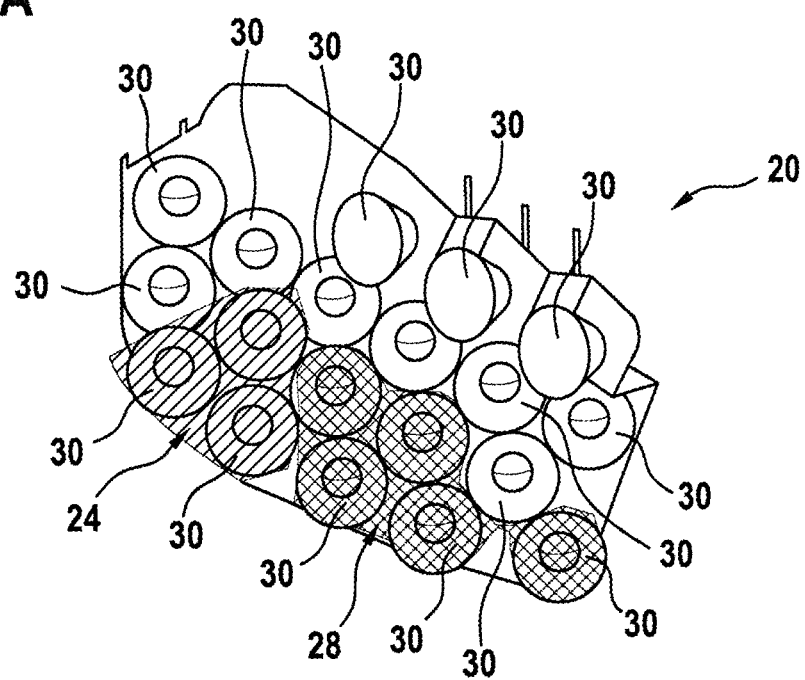
FIGS. 3A to 3C illustrate an example of a multi-purpose exterior aircraft light according to an exemplary embodiment of the invention.
Figure 3B:
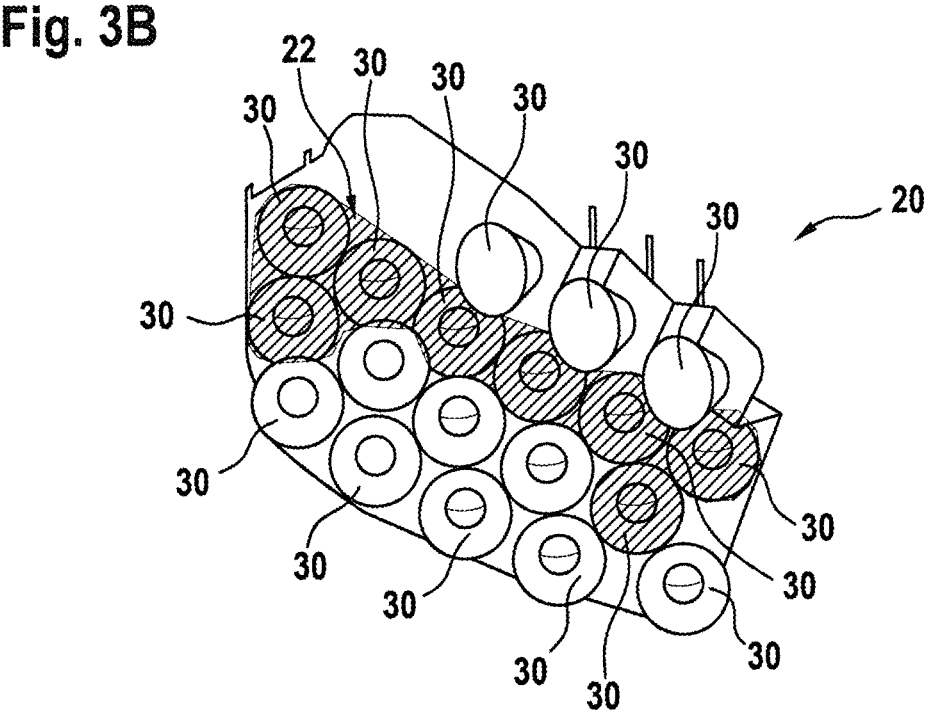
Figure 3C:
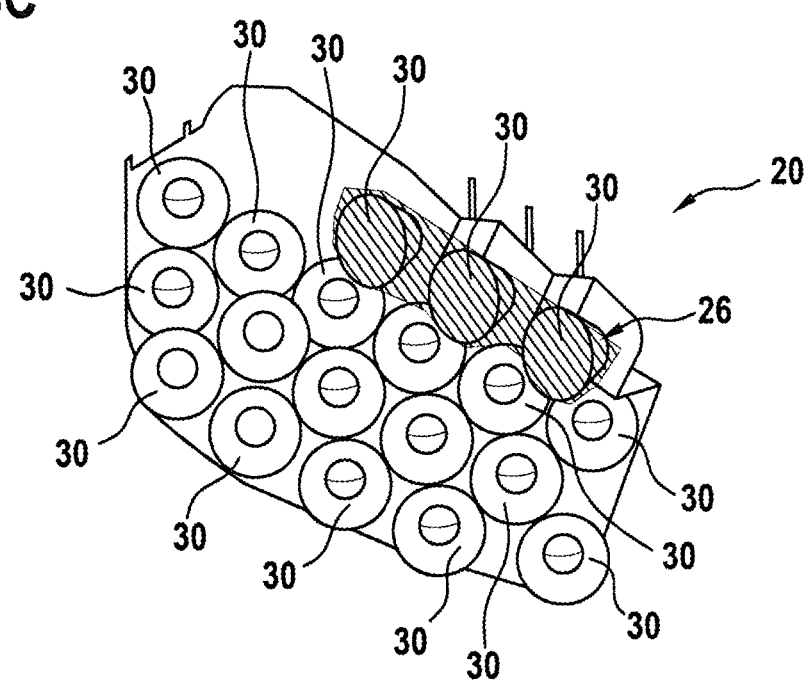

An example of a multi-purpose exterior aircraft light 20 is illustrated in FIGS. 3A to 3C. The multi-purpose exterior aircraft light 20 comprises a plurality of light source units 30, each of the light source units comprising a light source and a reflector, with the reflector directing the light from the light source into a desired direction.

The multi-purpose exterior aircraft light 20 of the exemplary embodiment of FIG. 3 comprises a plurality of groups 22, 24, 26, 28 of light source units 30. The light source units 30 of a first group 22 are configured to provide a landing light functionality; the light source units 30 of a second group 24 are configured to provide a taxi light functionality; the light source units 30 of a third group 26 are configured to provide a runway turn-off light (RTO light) functionality; and the light source units 30 of a fourth group 28 are configured to provide a take-off light functionality. It is understood that, in alternative embodiments, which are not shown in the figures, a multi-purpose exterior aircraft light 20 may comprise only two or three of said groups 22, 24, 26, 28, and the additional functionalities may be provided by additional exterior aircraft lights which are separate from the multi-purpose exterior aircraft light 20. In FIGS. 3A, 3B, and 3C, selected ones of the groups 22, 24, 26, 28 are overlaid with hatching, in order to illustrate which ones of the light source units 30 belong to which groups 22, 24, 26, 28. The hatching is an aid in the Figs. for purely illustrative purposes.

A mentioned before, each of the exterior aircraft lights 12, 14 and the exterior aircraft light 30 comprises at least one light source, such as an LED. When operated, the temperature of the at least one light source increases. In order to avoid damage of the at least one light source, the operating temperature should stay within an acceptable temperature range. In particular, in exemplary embodiments, the temperature of the at least one light source should not exceed a predetermined maximum temperature. The temperature of the light sources may differ, depending e.g. on their mounting positions and their local environment. For example, when looking at a particular light source, other light sources located next to the particular light source may contribute to the thermal load of the particular light source. Also, it is possible that due to space constraints, the heat sink of a particular light source may be smaller than would be desirable.

FIG. 4 shows an exemplary embodiment of an exterior aircraft light 20 comprising one switchable illumination circuit 32. The switchable illumination circuit 32 is configured to allow operating the at least one light source 34 thereof with high efficiency, without exceeding a predetermined maximum temperature of the respective light source 34. The light source 34 depicted in FIG. 4 may represent a plurality of light sources connected in series or in parallel to each other.

The switchable illumination circuit 32 is electrically connected to an electric power supply 40, which is configured for supplying an electric current, in particular a constant electric current, to the switchable illumination circuit 32.

The electric power supply 40 may be spatially separated from the switchable illumination circuit 32. The electric power supply 40 for example may have a distance of between 0.2 m and 10 m, in particular of between 0.2 m and 1 m, further in particular of between 0.2 m and 0.5 m, from the switchable illumination circuit 32. The electric power supply 40 may be integrated into the exterior aircraft light 12, 14 together with the switchable illumination circuit 32.

Alternatively, the electric power supply 40 may be located in the fuselage 4 of the aircraft 2, while the switchable illumination circuit 32 comprising the at least one light source 34 is provided in a wing 6 or at a running gear 10, 11 of the aircraft 2, as illustrated in FIG. 2.

The exterior aircraft light 20 may comprise one or more switchable illumination circuits 32. Although only a single switchable illumination circuit 32 is shown in FIG. 4, the skilled person will understand that a plurality of switchable illumination circuits 32, as shown in FIG. 4, may be connected in parallel to a single electric power supply 40.

Each switchable illumination circuit 32 comprises a temperature detector 38 configured for detecting the temperature of the at least one light source 34 and providing a temperature signal.

The temperature of the at least one light source 34 may be the temperature of the light source 34 itself or the temperature of an area surrounding the light source 34. The temperature detector 38 may be or include a temperature sensitive element (temperature sensor), which is configured for directly detecting (measuring) the temperature of or close to the associated light source 34. Alternatively or additionally, the temperature detector 14 may be or include a temperature determination element which is configured for determining the actual temperature indirectly, e.g. from the light emission generated by the respective light source 34, the current at the respective light source 34 or similar parameters.

The switchable illumination circuit 32 further comprises an electric switch 36 for selectively switching power flow to the at least one light source 34 on and off by interrupting the electric current supplied to the at least one light source 34. As a consequence, the at least one light source 34 is selectively switched on and off by the electric switch 36. The electric switch 36 may be an electromechanical relay comprising at least one mechanical switching element. Alternatively, the electric switch 36 may be a semiconductor switch, which does not comprise any mechanical/moving switching elements.

The switchable illumination circuit 32 also comprises a control circuit 39, which is coupled to the temperature detector 38 and to the electric switch 36. The control circuit 39 is configured for driving the electric switch 36 based on the temperature signal provided by the temperature detector 38 to repeatedly switch power flow to the at least one light source 34 on and off.

In a simple configuration, the control circuit 39 may be configured to drive the electric switch 36 to switch off the at least one light source 34 when the temperature signal provided by the temperature detector 38 exceeds a predetermined first threshold and to switch on the at least one light source 34 when the temperature signal provided by the temperature detector 38 falls below a predetermined second threshold. The first and second thresholds may be identical. Alternatively, the first threshold may be larger than the second threshold providing a hysteresis between the first and second thresholds.

In an alternative embodiment, the control circuit 39 may be configured for driving the electric switch 36 periodically, in particular by adjusting the duty cycle of the signal switching the electric switch 36 on and off, based on the temperature signal provided by the temperature detector 38. This driving of the electric switch 36 is particularly beneficial, because the illumination by the at least one light source 34 can be perceived as continuous, in particular when the frequency of the periodic switching is above 50 Hz, while the off times allow the at least one light source 34 to cool down in a periodic manner.

The period of time the electric switch 36 and in consequence the at least one light source 34 are switched on may be reduced when the temperature detected by the temperature detector 38 increases, and the period of time the electric switch 36 and the at least one light source 34 are switched on may be increased when the temperature detected by the temperature detector 38 decreases. This in particular may result in a PWM modulation of the at least one light source 34 which is based on the temperature detected by the temperature detector 38. As a result, the at least one light source 34 may be operated with high efficiency, without exceeding a predetermined maximum temperature.

The control circuit 39 in particular may be configured for driving the electric switch 36 with a frequency of 100 Hz to 20 kHz, in particular with a frequency of 100 Hz to 1 kHz, more particularly with a frequency of 400 Hz to 500 Hz. These frequencies are high enough so that the switching of the at least one light source 34 will not be recognized by the human eye and therefore does not negatively affect the impression of illumination.

The control circuit 39 may be configured for controlling the electric switch 36 to switch power flow to the at least one light source 34 so that the temperature detected by the temperature detector 38 does not deviate more than 10%, in particular not more than 5%, from a given reference temperature value.

The reference temperature value may be predetermined or set by a global control circuit, e.g. when doing load leveling among different switchable illumination circuits. The reference temperature value also may be provided by the manufacturer of the respective light source(s) 34 representing the preferred temperature for operating the at least one light source 34.

The switchable illumination circuit 32 may form a functional unit of spatially associated components, wherein the at least one light source 34, the temperature detector 38, the electric switch 36 and the control circuit 39 of each of the switchable illumination circuit 32 are in particular arranged within less than 10 cm from each other, further in particular 6 cm or less from each other.

The control circuit 39 may be a hardware circuit or may comprise a microprocessor implementing the control described above or may be any other kind of suitable component for effecting the control of electric switch 36.

Figure 5:
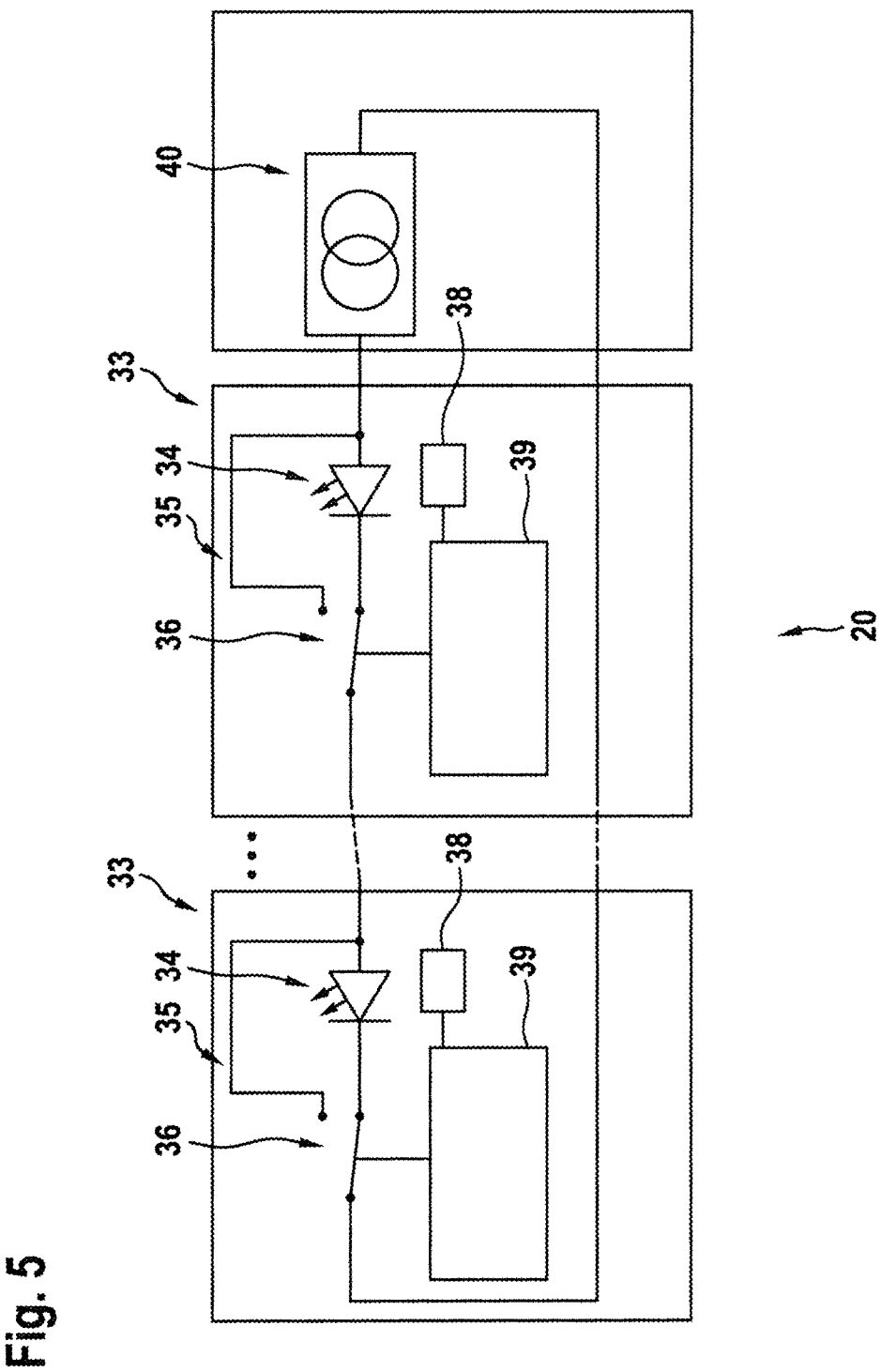
FIG. 5 depicts another exemplary embodiment of a switchable illumination circuit together with a power supply in a circuit/block diagram.

FIG. 5 shows an exemplary embodiment of an exterior aircraft light 20 comprising a plurality of switchable illumination circuits 33 according to another exemplary embodiment of the invention.

As in the embodiment depicted in FIG. 4, each switchable illumination circuit 33 comprises at least one light source 34, an electric switch 36, a temperature detector 38 and a control circuit 39. The functionality of the temperature detector 38 and of the control circuit 39 corresponds to the functionality described with respect to FIG. 4 and therefore will not be discussed in detail again.

Deviating from the embodiment depicted in FIG. 4, a current bypass 35 is provided. The current bypass 35 allows selectively bypassing the electric current, flowing through the switchable illumination circuits 33, by the at least one light source 34. The electric switch 36 is provided for activating said current bypass 35 in order to switch off the at least one light source 34.

Due to the current bypass 35, the electric current flowing through the switchable illumination circuits 33 is not interrupted when the at least one light source 34 is switched off. In consequence, a plurality of switchable illumination circuits 33, e.g. 2, 3, 4, 5, 6, 7, 8, 9, 10 or more switchable illumination circuits, may be connected in series with each other to a common electric power supply 40, and the light sources 34 of the plurality of switchable illumination circuits 33 still may be switched on and off independently from each other. In particular, the at least one light source 34 of at least one switchable illumination circuit 33 may be operated (switched on) even if the at least one light source 34 of at least one other switchable illumination circuit 33 is switched off. The temperature of the at least one light source of each of the switchable illumination circuits 33 can be controlled individually and locally.

The common power supply 40 is configured for quickly compensating for the change of power demands (change of electric resistance), when power flow to the light sources 34 of individual switchable illumination circuits 33 is switched on and off. In consequence, a nearly constant electric current flows through the serial chain of switchable illumination circuits 33 independently of the varying number of light sources which are switched on and off.

Serially connecting the switchable illumination circuits 33, as it is shown in FIG. 5, allows for an easy installation of a plurality of switchable illumination circuits 33 at low costs, since only a single electric circuit is needed for supplying electric power to all switchable illumination circuits 33. Also, no communication means between the switchable illumination circuits 33 and the electric power supply 40 are necessary. The power connection between the electric power supply 40 and the switchable illumination circuits 33 can be the only connection between those entities. No further control wires or wireless communication modules are needed. It is, however, also possible that an additional signal line is present, e.g. for communicating different reference temperature values to the different switchable illumination circuits 33 in case of load leveling between the different switchable illumination circuits 33.

It is for example possible that each of the switchable illumination circuits 33 of FIG. 5 is used for one of the groups of light source units 30 of the multi-purpose exterior aircraft light 20 of FIG. 3. In particular, the first group 22 of light source units 30 may belong to a first switchable illumination circuit 33, the second group 24 of light source units 30 may belong to a second switchable illumination circuit 33, the third group 26 of light source units 30 may belong to a third switchable illumination circuit 33, and the fourth group 28 of light source units 30 may belong to a fourth switchable illumination circuit. The light sources may be arranged in series for each of the switchable illumination circuits 33, i.e. the at least one light source 34 of FIG. 5 may be a respective plurality of light sources, in particular LEDs. The respective temperature detectors 38 may be associated with the respective light source groups. If a more granular temperature control is desired, it is also possible to provide a switchable illumination circuit 33 of FIG. 5 for each one of the light source units 30 of FIG. 3. It is also possible to use a switchable illumination circuit 32 of FIG. 4 for each one of the light source units 30 of FIG. 3 or for each of the groups 22, 24, 26, 28 of light source units 30 of FIG. 3.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An exterior aircraft light comprising at least two switchable illumination circuits, each of the at least two switchable illumination circuits comprising:
    at least one light source;
    a temperature detector configured for detecting the temperature of the at least one light source of a respective switchable illumination circuit and providing a corresponding temperature signal;
    an electric switch for selectively switching power flow to the at least one light source on and off;
    a control circuit, coupled to the temperature detector and to the electric switch, wherein the control circuit is configured for driving the electric switch based on the temperature signal provided by the temperature detector of the respective switchable illumination circuit to repeatedly switch power flow to the at least one light source on and off;
    wherein the exterior aircraft light is one of a landing light, a taxi light, a runway turn-off light, a take-off light, and a multi-purpose light combining the functionality of at least two of a landing light, a taxi light, a runway turn-off light and a take-off light;
    wherein each of the switchable illumination circuits of the landing light, the taxi light, the runway turn-off light, the take-off light, or the multi-purpose light forms a functional unit of spatially associated components in which the at least one light source, the temperature detector, the electric switch and the control circuit are arranged within less than 10 cm from each other; and
    wherein each of the at least one switchable illumination circuit comprises a current bypass and wherein the electric switch is configured for bypassing the electric current by the at least one light source via the current bypass in order to switch off power flow to the at least one light source.

2. The exterior aircraft light according to claim 1, wherein the control circuit is configured for driving the electric switch to periodically switch power flow to the at least one light source on and off.

3. The exterior aircraft light according to claim 2, wherein the control circuit is configured for adjusting the duty cycle based on the temperature signal provided by the at least one temperature detector.

4. The exterior aircraft light according to claim 2, wherein the control circuit is configured for driving the electric switch to switch power flow to the at least one light source on and off with a frequency of 100 Hz to 20 kHz.

5. The exterior aircraft light according to claim 2, wherein the control circuit is configured for driving the electric switch to switch power flow to the at least one light source on and off with a frequency of 100 Hz to 1 kHz.

6. The exterior aircraft light according to claim 2, wherein the control circuit is configured for driving the electric switch to switch power flow to the at least one light source on and off with a frequency of 400 Hz to 500 Hz.

7. The exterior aircraft light according claim 1, wherein the electric switch is configured for interrupting the electric current flowing through the switchable illumination circuit in order to switch off power flow to the at least one light source.

8. The exterior aircraft light according to claim 1, wherein the control circuit is configured for controlling the electric switch to switch power flow to the at least one light source so that the temperature detected by the temperature detector does not deviate more than 10% from a reference temperature value.

9. The exterior aircraft light according claim 1, wherein the at least one light source is at least one LED.

10. The exterior aircraft light of claim 1, further comprising:
    an electric power supply which is configured for supplying a constant electric current to each of the at least one switchable illumination circuit, wherein the electric power supply is spatially separated from the at least one switchable illumination circuit.

11. The exterior aircraft light according to claim 10, wherein the electric power supply has a distance of between 0.2 m and 10 m from the at least one switchable illumination circuit.

12. The exterior aircraft light according to claim 10, wherein the electric power supply has a distance of between 0.2 m and 1 m from the at least one switchable illumination circuit.

13. The exterior aircraft light according to claim 10, wherein the electric power supply has a distance of between 0.2 m and 0.5 m from the at least one switchable illumination circuit.

14. An aircraft comprising an exterior aircraft light according to claim 1.

15. A method of operating an exterior aircraft light comprising at least two switchable illumination circuits, each of the at least two switchable illumination circuits comprising at least one light source, a temperature detector configured for detecting the temperature of the at least one light source of a respective switchable illumination circuit, and an electric switch for selectively switching power flow to the at least one light source on and off,
    wherein the exterior aircraft light is one of a landing light, a taxi light, a runway turn-off light, a take-off light, and a multi-purpose light combining the functionality of at least two of a landing light, a taxi light, a runway turn-off light and a take-off light,
    wherein each of the switchable illumination circuits of the landing light, the taxi light, the runway turn-off light, the take-off light, or the multi-purpose light forms a functional unit of spatially associated components in which the at least one light source, the temperature detector, the electric switch and the control circuit are arranged within less than 10 cm from each other,
    wherein each of the at least one switchable illumination circuit comprises a current bypass, which allows bypassing the electric current by the at least one light source, and
    wherein the method includes for each of the at least two switchable illumination circuits:
    detecting the temperature of the at least one light source; and controlling the electric switch for repeatedly switching power flow to the at least one light source of the respective switchable illumination circuit on and off by selectively bypassing the electric current by the at least one light source via the current bypass based on the detected temperature of the at least one light source.

* * * * *